Feb. 12, 1963  C. S. COCKERELL  3,077,174
VEHICLES FOR TRAVELLING OVER WATER
Filed March 7, 1961  2 Sheets-Sheet 1
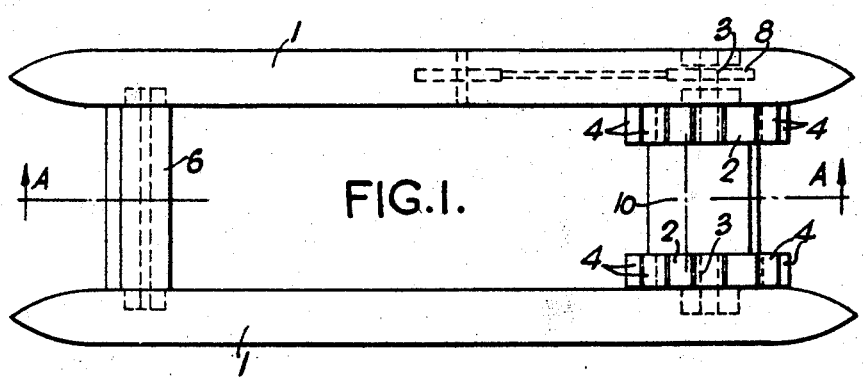
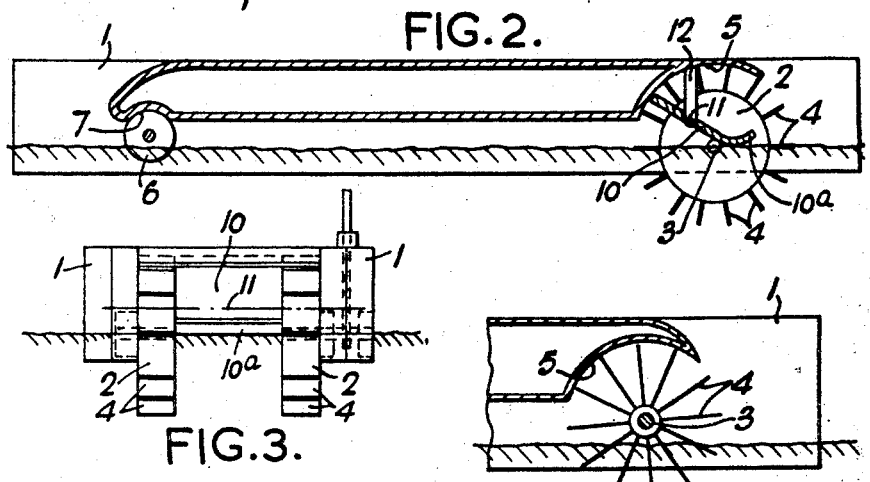
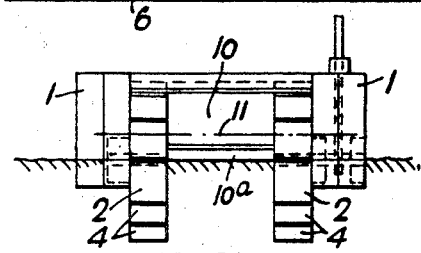
FIG.3.
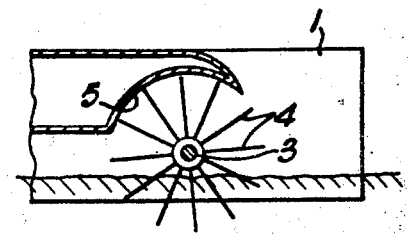
FIG.4.
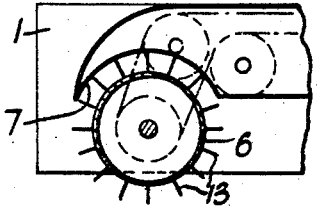
FIG.5.
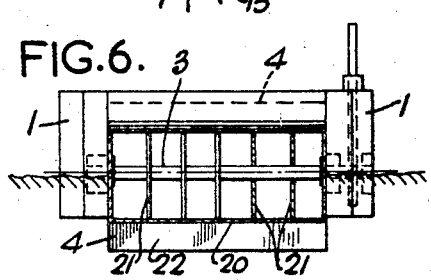
FIG.6.
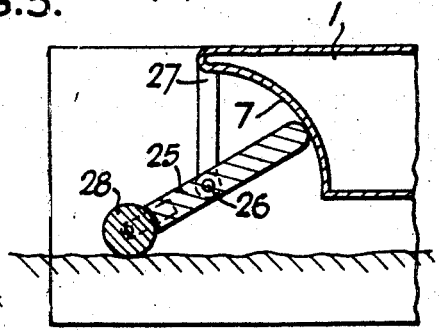
FIG.7.
Inventor
C. S. COCKERELL
By Cameron, Kerkam & Sutton
Attorneys Feb. 12, 1963 C. S. COCKERELL 3,077,174
VEHICLES FOR TRAVELLING OVER WATER
Filed March 7, 1961 2 Sheets-Sheet 2

Inventor
C. S. COCKERELL
By Cameron, Kerkam & Sutton
Attorneys

United States Patent Office 3,077,174
        Patented Feb. 12, 1963

3,077,174
VEHICLES FOR TRAVELLING OVER WATER
Christopher Sydney Cockerell, Lymington, England, assignor to Hovercraft Development Limited, London, England, a British company
Filed Mar. 7, 1961, Ser. No. 93,915
Claims priority, application Great Britain Mar. 11, 1960
12 Claims. (Cl. 114—67)

This invention relates to vehicles for travelling on water in which the vehicle is wholly or partly supported on the surface of the water by at least one cushion of pressurized air contained beneath the body of the vehicle.

According to the invention there is provided a vehicle for travelling over water, having a main body with at least two walls depending from the bottom thereof, the walls being spaced apart and extending substantially parallel to each other and to the fore and aft axis of the vehicle, closure means closing the gaps between said walls at the two ends of the vehicle, said walls and said closure means defining an air space beneath the vehicle, the closure means at the rear end being formed at least in part by a rotatable member having paddles or vanes and mounted for rotation on a horizontal axis transverse to the fore and aft axis of the vehicle and partially immersed in the water, so as to act, on rotation, as a pump to raise the pressure of the air in the space beneath the vehicle whereby the vehicle is at least partially supported on a cushion of pressurized air.

The gap or gaps between the front ends of the walls may also be at least partly closed by a rotating member or rotating members and according to another feature of the invention there is provided at least one substantially horizontal rotatably mounted cylindrical member at least partly closing the gap or gaps between the front ends of the walls, any remaining gap or gaps at the front being closed by a closure member or members as aforesaid.

The front cylindrical member may also be provided with paddles or vanes, in which case it is necessary for them to be of such configuration that the mass flow of the air forced into the space by the rear member is greater than the mass flow which escapes from the said space by means of the paddles or vanes on the front member.

Figure 8:
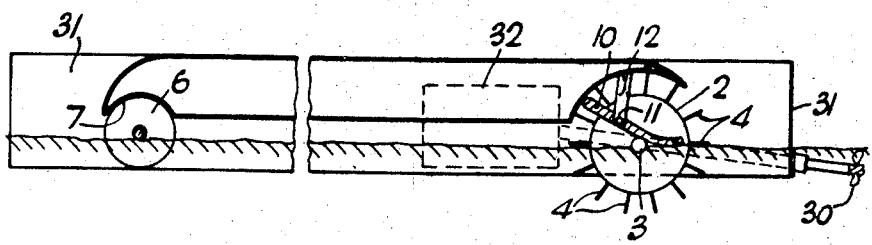
Figure 9:
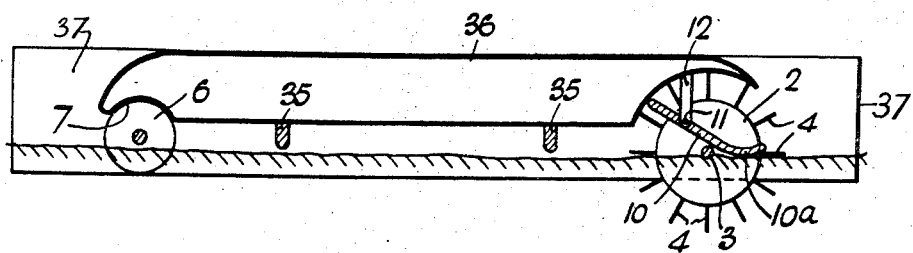

The invention will be readily understood by the following description of certain embodiments in conjunction with the following drawings in which:

FIGURE 1 is an inverted plan view of a vehicle according to the invention,
FIGURE 2 is a vertical cross-section on the line A—A of FIGURE 1,
FIGURE 3 is an end view of the rear of the vehicle shown in FIGURE 1,
FIGURE 4 is a fragmentary vertical cross-section of the rear of the vehicle shown in FIGURE 1 illustrating a modification thereof,
FIGURE 5 is a fragmentary vertical cross-section of the front of the vehicle shown in FIGURE 1 illustrating a modification thereof,
FIGURE 6 is an end view of the vehicle shown in FIGURE 1, similar to FIGURE 3, but with a rotating member in section and illustrating a modification thereof,
FIGURE 7 is a fragmentary vertical cross-section of the front of the vehicle as in FIGURE 1 illustrating a hinged sealing member,
FIGURE 8 is a vertical cross-section of a vehicle similar to that of FIGURE 2 illustrating a further embodiment of the invention, and
FIGURE 9 is a vertical cross-section similar to that shown in FIGURE 2 illustrating means for dividing the space occupied by the air cushion.

The vehicle has an elongated body portion with two side walls 1, one on each side, depending from the bottom of the body and extending the length thereof, somewhat in the form of a catamaran having a deck connecting two floats, the side walls having sufficient buoyancy to provide initial flotation of the vehicle and capable of providing roll stability.

At the rear end of the vehicle are rotatably mounted two cylindrical members 2, each member being adjacent to a side wall and leaving a gap between the members. The members rotate about a horizontal axis being carried on shafts 3 mounted in bearings carried by the side members 1. Attached to, or forming part of, the outer surface of the members are radial paddles or vanes 4, the longitudinal axis of which is parallel to the axis of the shaft carrying the member. The underpart 5 of the body or deck of the vehicle adjacent to the rotating members is shaped, e.g. curved, so as to co-operate with the tips of the paddles or vanes.

The front end of the vehicle has a similar rotatably mounted cylindrical member 6, extending the full width of the gap, but with the paddles or vanes omitted. The under surface 7 of the body or deck of the vehicle is shaped, e.g. curved, as at the rear end of the vehicle so as to cooperate with the external surface of the rotating member 6. In order to reduce the area of contact between the surfaces of the rotating members and the under surface of the body or deck of the vehicle and to improve the sealing, small longitudinal ribs of flexible material may be formed on either of the surfaces.

The shafts 3 and the cylindrical members 2 at the rear end of the vehicle are rotated, for example, by means of a gear wheel 8 attached to the shafts. Suitable linkages and chains or the like connect the gears with levers or other members which are operated by the hands and/or feet of the person or persons riding in the vehicle.

The bottoms of the side walls are always immersed in the water, and where paddles or vanes are provided on the cylindrical members these also are always immersed in the water when at the lowest position as well as possibly part of the cylindrical member. The remaining gap at the rear end is closed by a flap 10 mounted on a pivot 11 supported by brackets 12 on the vehicle body.

As the person on the vehicle operates the levers, the rear cylindrical members 2 will rotate causing the vehicle to move forward, on the water. Air will be taken in over the top of the rotating member and forced in under the vehicle body, which may or may not be initially clear of the water. As air is forced in under the vehicle body, the vehicle will commence to lift, less of the side walls being immersed in the water. The vehicle will eventually reach an equilibrium position where the paddles or vanes can just maintain the cushion pressure and make good any air losses that occur from the cushion.

Movement of the vehicle on the water will also cause the front cylindrical member to rotate, providing a substantially air tight seal which at the same time has a low drag due to its rotation.

FIGURE 4 illustrates a modification of the invention in which the cylindrical members at the rear of the vehicle are entirely in the form of paddle wheels. In such a vehicle, once the cushion has been formed and has lifted the vehicle up, if more than half of the diameter of the paddle wheels is clear of the water, air will also pass out from the space beneath the vehicle body through the bottom of the paddle wheels. This will however only be some portion of the air entering through the top half of each paddle wheel.

Where as illustrated in FIGURE 5 the rotatable cylindrical member 6 at the front end is also in the form of a paddle wheel, for example to increase the propulsion effort available, then it is necessary to ensure that the mass flow of air passing out through each front paddle wheel is less than the mean mass flow passing in at the rear. This can be obtained in various ways. In FIGURE 5 the vanes 13 at the front are made much shorter than the vanes 4 at the rear of the vehicle. They will therefore allow less air to pass through than is pumped in by the rear vanes, for an equivalent axial length of the rotatable member. The total width of the front wheel or wheels can also be made less than that of the rear wheel or wheels. Alternatively, or in addition, the diameter of the front wheel or wheels can be less than the rear ones. A further alternative is to use a form of construction in which at least a portion of each blade is blanked off when travelling round the top half of the path of rotation. For example, the vanes may be slidably mounted in slots in a cylindrical member carried by the shaft, the blades sliding or being pushed to the bottom of the slots as they start to traverse the top half of their travel and sliding or being pushed out again as they start to traverse the bottom half of their travel. This form of construction is very similar to that of sliding vane type pumps or motors.

Where the rotating members at the front and/or back are in the form of rotating cylinders, they can be made flexible as illustrated in FIGURE 6 by making them in the form of hollow cylindrical inflated bags 20 of for example rubberised fabric. A number of flexible diaphragms 21 are preferably provided, spaced apart inside the bag to ensure that when the bags are inflated they will be cylindrical in form. Also, if the bags have paddles or vanes 22 fastened to the outside surface, the diaphragms 21 will transmit torque from the central shaft 3 to the outside skin of the bag. This form of construction will allow the rotating member to deflect when passing over a wave. The paddles or vanes may form an integral part of such a flexible bag or cylinder and may themselves be of flexible material held in position by air pressure. It will also allow deflection of the bag to progress across the width of the rotating member when the vehicle passes over a wave which is moving at an angle to the direction of motion of the vehicle.

In a further form of vehicle according to the invention, any gap at the front and/or back of the side walls not closed by a rotatable member is closed by a hinged flap which extends across the full width of the gap, the flap carrying a rotatably mounted cylindrical member on its lower edge as illustrated in FIGURE 7. The main part of the vertical height of the gap is closed by a flap 25, hinged at 26 on supporting members 27 attached to the main body of the vehicle. The bottom part is closed by a rotatable member 28 attached to the bottom of the flap 25. No vanes are provided on the periphery of the rotatable member 28, and the surface drag is of a low order.

It will be appreciated that some form of sealing between the vertical edges of any flaps and the adjacent structure is preferable. This can be provided by attaching strips of rubber or other flexible or resilient material to the edges of the flaps.

In order to keep the volume of the air cushion to be built up beneath the vehicle to a minimum, the centre of the bottom surface of the body of the vehicle may be shaped as shown in FIGURE 2, so that it is nearer to the surface than at the ends where the rotating members are positioned.

In the vehicles, so far described, it has been assumed that they are propelled by manpower operating levers or the like. The vehicles can also, of course, be propelled by mechanical power. FIGURE 8 which is a vertical cross-section illustrates a vehicle, similar in most respects to that illustrated in FIGURES 1 to 3, in which the vehicle is propelled by means of propellers 30, one at the rear of each wall 31. In large vehicles, engines 32 for driving the propellers 30 can be positioned in the walls 31. In vehicles where the walls are not thick enough to contain the engines, the engines may be mounted on the deck of the vehicles and connected to the propellers by shafting.

It is also possible for the vehicle to be propelled by a sail or sails. When the vehicle is propelled by such means the passage of the vehicle through the water causes the rotating member or members to rotate and pump air into the space beneath the vehicle to form the cushion of pressurised air. The effect of the cushion in lifting up the vehicle reduces the immersion of the side walls and thus reduces drag.

When flaps or similar closure members are provided at the rear, as in FIGURES 1 and 2, the lower edge of the flap should be formed as shown at 10a in FIGURE 2 so that it will rest on the surface of the water whenever the vehicle is moving and will not dig-in when going backwards.

The vehicle will be reasonably stable in operation due to the walls being at all times at least partially immersed and acting as buoyancy chambers. The stability can be further increased subdividing the space occupied by the cushion. In FIGURE 9, which is a vertical cross-section parallel to the longitudinal axis of a vehicle, flexible flaps 35 are attached to the bottom of the body 36 of the vehicle, extending across the space between the walls 37. When the air cushion is being formed, the flaps 35 deflect upwards and allow air to flow to all parts of the cushion space. Once the air cushion has been formed the flaps 35 will extend downwards as shown, and will provide a resistance to air flowing between various parts of the cushion. Thus any pressure variations occurring in parts of the cushion due to a variation in attitude of the vehicle will be maintained for a longer period than would otherwise occur and will provide increased righting moments. Flaps extending across the cushion will improve the stability in roll and flaps extending lengthwise of the cushion will improve the stability in heave. A combination of flaps extending across and lengthwise would normally be provided.

Vehicles according to the invention, without means for propulsion, can be used as barges. One or more such barges can be towed by a tug, which may itself be in the form somewhat as shown in FIGURE 8. The action of being towed through the water will cause the bladed rotary members to pump in air to form the air cushion.

When flaps are used to close any part of a gap between the ends of the walls, provision may be made to eject air through a port or ports in the bottom of the flap to form an air seal having low drag.

I claim:

1. A vehicle for travelling over water comprising a main body having at least two walls depending from the bottom thereof, the walls being spaced apart and extending substantially parallel to each other and to the fore and aft axis of the vehicle, closure means closing the gaps between said walls at the two ends of the vehicle, said walls and said closure means defining with the bottom of said main body an air space beneath the vehicle, the closure means at the rear end being formed at least in part by a rotatable member having paddles or vanes and mounted for rotation on a horizontal axis transverse to the fore and aft axis of the vehicle, said rotatable member being partially immersed in the water and having its axis of rotation so disposed with respect to the bottom of said main body as to act, on rotation, as a pump to raise the pressure of the air in the space beneath the vehicle whereby the vehicle is at least partially supported on a cushion of pressurised air.

2. A vehicle as claimed in claim 1 including means for driving said rotatable member to provide a propulsive force for said vehicle.

3. A vehicle as claimed in claim 1 wherein the gap between the walls at either end is closed at least in part by a hinged flap member the free edge of which is supported at the surface of the water.

4. A vehicle as claimed in claim 3 including means below the body of the vehicle for subdividing the air space beneath it into a plurality of cushion spaces.

5. A vehicle as claimed in claim 4 wherein the air cushion space is subdivided longitudinally of the vehicle and separate rotatable members are provided, associated with each of two marginal subdivisions of said cushion space.

6. A vehicle as claimed in claim 1 wherein the gap between said walls at the front end is closed at least in part by a rotatable member mounted for rotation on a horizontal axis transverse to the fore and aft axis of the vehicle.

7. A vehicle as claimed in claim 6 wherein the rotatable member at the front of the vehicle is provided with a number of paddles or vanes on the periphery thereof, and in which, on rotation of the rotatable member, the mass flow of air from the cushion space beneath the vehicle past the rotatable member at the front of the vehicle is less than the mass flow of air pumped into the cushion space by the rotatable member at the rear of the vehicle.

8. A vehicle for travelling over water comprising a main body having a pair of laterally spaced side walls depending from the bottom thereof and extending substantially parallel to the fore and aft axis of the vehicle, closure means closing the gaps between said side walls at the two ends of the vehicle, said side walls and said closure means cooperating with each other and with the bottom of said main body to form an air space beneath the vehicle, the closure means at the front end of the vehicle including a rotatable cylindrical member extending the full width of the gap between said side walls and mounted for rotation on a horizontal axis transverse to the fore and aft axis of the vehicle with the lower portion of said member immersed in the water, the closure means at the rear end of the vehicle including at least one rotatable cylindrical member having a plurality of paddles or vanes extending outwardly from the cylindrical surface thereof and mounted for rotation on a horizontal axis transverse to the fore and aft axis of the vehicle with the lower portion of said member immersed in the water, the axis of rotation of said member at the rear end of the vehicle being so disposed with respect to the bottom of said main body, and the direction of rotation of said member being such, that said paddles or vanes pump air from the atmosphere into the space beneath the vehicle so as to raise the pressure of the air in said space, whereby the vehicle is at least partially supported on a cushion of pressurised air.

9. A vehicle as claimed in claim 8 wherein the closure means at the rear end of the vehicle includes a pair of rotatable cylindrical members having paddles or vanes extending outwardly from the cylindrical surface thereof, each being positioned immediately adjacent one of said side walls, and a flap member closing the gap between said pair of rotatable members, said flap member being pivotally supported by the main body of the vehicle with the lower edge thereof resting on the surface of the water.

10. A vehicle for travelling over water comprising a main body having a pair of laterally spaced side walls depending from the bottom thereof and extending substantially parallel to the fore and aft axis of the vehicle, closure means closing the gaps between said side walls at the two ends of the vehicle, said side walls and said closure means cooperating with each other and with the bottom of said main body to form an air space beneath the vehicle, the closure means at each end of the vehicle being formed at least in part by a rotatable cylindrical member having a plurality of paddles or vanes extending outwardly from the surface thereof and mounted for rotation on a horizontal axis transverse to the fore and aft axis of the vehicle with the lower portion of said member immersed in the water, the axis of rotation of said member at the rear end of the vehicle being so disposed with respect to the bottom of said main body, and its direction of rotation being such, that the paddles or vanes thereof pump air from the atmosphere into the space beneath the vehicle so as to raise the pressure of the air in said space, the rotatable member at the front end of the vehicle being so constructed and arranged that the mass flow of air pumped thereby out of the cushion space beneath the vehicle is less than the mass flow of air pumped into said cushion space by the rotatable member at the rear of the vehicle.

11. A vehicle as claimed in claim 8 wherein the main body of the vehicle is so shaped that the bottom surface thereof is closer to the surface of the water throughout the major portion of its length than it is at the front and rear ends of the vehicle where the rotatable closure members are positioned.

12. A vehicle as claimed in claim 8 wherein the rotatable member at the rear end of the vehicle is an inflatable bag of flexible material mounted on a transversely extending rotatable shaft and having a plurality of diaphragms within the bag interconnecting the cylindrical surface thereof with said shaft.

References Cited in the file of this patent

UNITED STATES PATENTS

| | | |
|---|---|---|
| 1,022,250 | McDougall | Apr. 2, 1912 |
| 1,070,878 | Dinesen | Aug. 19, 1913 |
| 1,412,848 | Dunajeff | Apr. 18, 1922 |
| 1,621,625 | Casey | Mar. 22, 1927 |
| 1,819,216 | Warner | Aug. 18, 1931 |
| 2,036,185 | Baker | Apr. 7, 1936 |
| 2,165,757 | McLaughlin | July 11, 1939 |
| 2,294,104 | Waddington | Aug. 25, 1942 |
| 2,907,296 | Roby | Oct. 6, 1959 |

FOREIGN PATENTS

| | | |
|---|---|---|
| 674,211 | Great Britain | June 18, 1952 |